No. 767,040. Patented August 9, 1904.

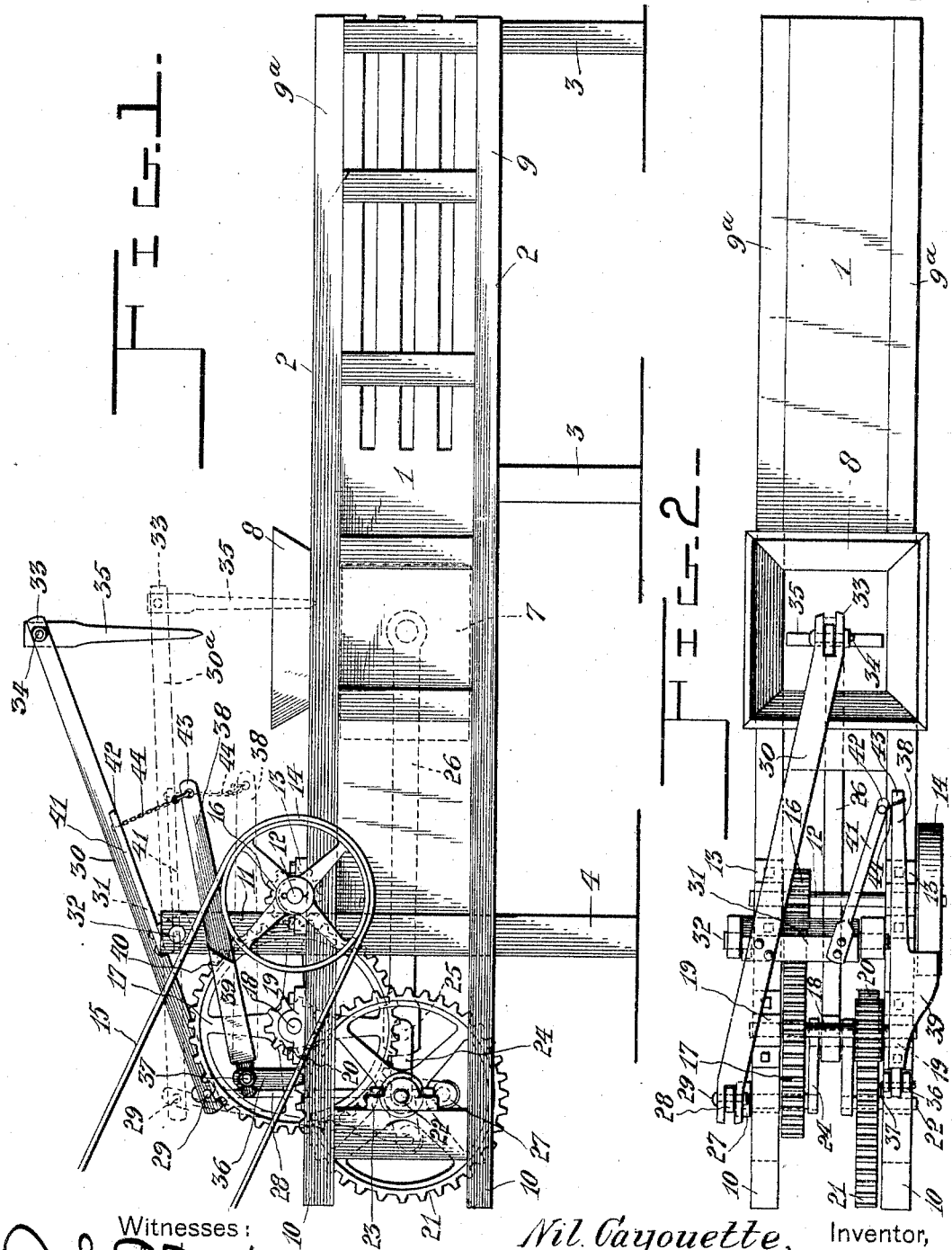

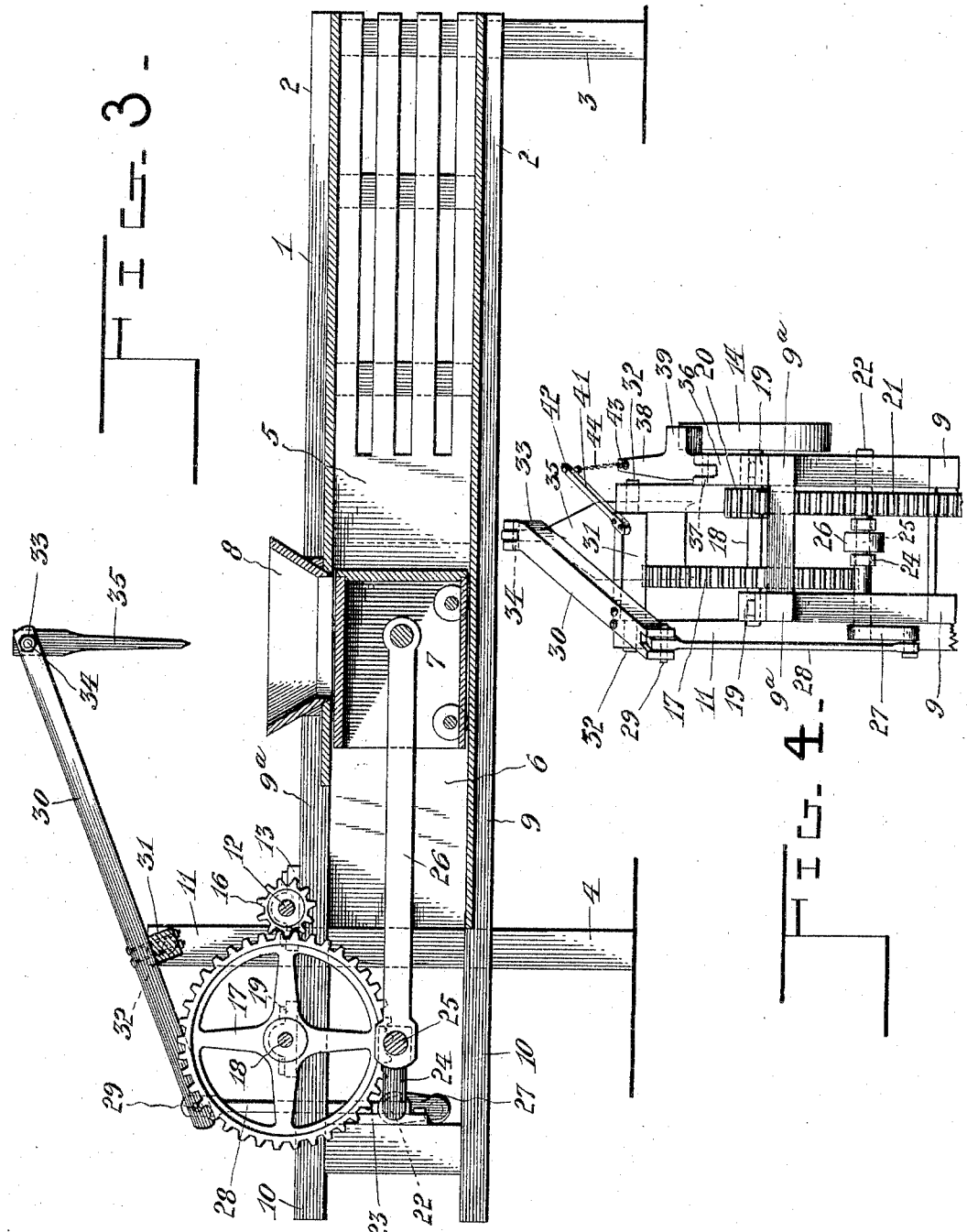

UNITED STATES PATENT OFFICE.

NIL CAYOUETTE, OF AMQUI, CANADA.

HAY-PRESS.

SPECIFICATION forming part of Letters Patent No. 767,040, dated August 9, 1904.

Application filed July 17, 1903. Serial No. 166,058. (No model.)

*To all whom it may concern:*

Be it known that I, NIL CAYOUETTE, a subject of the King of Great Britain, residing at Amqui, county of Matane, Province of Quebec, Canada, have invented certain new and useful Improvements in Hay-Presses; and I do hereby declare that the following is a full, clear, and exact description of the invention, such as will enable others skilled in the art to which it appertains to make and use the same.

My invention relates to hay-presses such as used for compressing hay into compact bundles or bales.

The object of the invention is to provide a simple arrangement for effecting the purposes mentioned, with a special view to driving the apparatus by means of an ordinary horse-power.

The invention consists in the construction and combination of parts to be more fully described hereinafter and definitely set forth in the claims.

In the drawings which fully illustrate my invention, Figure 1 is a side elevation. Fig. 2 is a plan. Fig. 3 is a longitudinal central section. Fig. 4 is an end elevation.

Throughout the drawings and specification the same numerals of reference indicate like parts.

Referring more particularly to the parts, 1 represents the body of the press, which, as indicated, is of the usual elongated rectangular form, comprising a suitable frame 2, mounted upon standards or supports 3 and 4 in the manner shown. The body 1 comprises a chamber 5, within which the hay is compressed, the forward portion 6 of which chamber constitutes a guide for a plunger or piston 7, adapted to reciprocate therein. At a suitable point in its upper wall the said body is provided with a receiver or hopper 8, through which hay may be introduced to the interior of the body for the purpose of compressing the same, it being understood that when the plunger is in its withdrawn position the receiver 8 communicates with the space below the same.

It should be observed that the aforesaid frame 2 comprises four longitudinally-disposed stringers 9 and $9^a$, which project beyond the aforesaid standards 4 as extensions 10, the said standards 4 extending upwardly from the body, as indicated at 11. Upon the upper sides of the stringers $9^a$ there is supported a transverse shaft or axle 12, the same being suitably mounted in the bearings 13 and carrying a belt-wheel 14 at its extremity, as shown, which belt-wheel is driven by a suitable belt 15. Near its opposite extremity the said shaft 12 carries rigidly a pinion 16, which pinion meshes with a gear-wheel 17, the same being carried upon a second transverse shaft 18, the said shaft being disposed transversely of the body and mounted in bearings 19, which may be similar to the aforesaid bearings 13. Near its extremity opposite to the gear-wheel 17 the said shaft 18 carries rigidly a pinion 20, which pinion meshes with a gear-wheel 21, rigidly mounted upon a crank-shaft 22. It should be observed that this crank-shaft is rotatably mounted upon the frame in suitable bearings 23, between which is disposed a crank 24, which this crank-shaft comprises. This crank includes a crank-pin 25, to which there is attached the extremity of a pitman or connecting rod 26, which is attached to the plunger 7, as indicated, and affords means for actuating the same, as will be readily understood. From this arrangement it should appear that the rotation of the wheel 14 is transmitted at a much reduced velocity ratio to the crank-shaft, so as to effect a reciprocation of the plunger 7 in the manner suggested.

Arrangement is made for facilitating the feeding of the hay into the chamber 5 during the operation of the machine. To this end one extremity of the aforesaid crank-shaft 22 is provided with a crank 27, to which crank there is attached a link 28, which is disposed substantially vertically, the upper extremity of the said link being pivotally attached at 29 to a walking-beam or feed-arm 30. It should appear that this feed-arm 30 is rigidly attached to a cross-bar 31, and this cross-bar is provided at its extremities with trunnions or gudgeons 32, which are rotatably mounted in the upper extremities of the extensions 11 aforesaid. It should also be observed that though the aforesaid crank 27 is disposed at one side of the machine the said beam 30 is disposed in an inclined direction in such a manner as to bring its extremity 33 substantially above the aforesaid receiver or hopper 8, and at this point the arm has attached thereto pivotally, as indicated at 34, a depending head 35, the function of which head is to pass periodically into the said receiver in such a manner as to carry down the hay into the interior of the body, as will be readily understood.

It should be observed that the crank 27 aforesaid is disposed substantially at right angles to the crank 24, from which arrangement it follows that when the plunger 7 is in its extreme forward position the head 35 is then in its extreme elevated position, and when the plunger begins to withdraw from the position in which it is shown in Fig. 3 the head 35 begins to descend, and the head will operate to press down any hay which had been received by the hopper, so as to bring this hay into the path of the plunger upon the next stroke.

As the plunger 7 is returning from the position in which it is shown in Fig. 3 the elastic force of the hay which it has compressed usually operates to transmit an impulsive force to the crank, which has the effect of giving a sudden impetus to the machinery, which is undesirable. Arrangement is made for meeting this difficulty. For this purpose one of the stringers 9ª is provided at a suitable point with a bracket or standard 36, to which there is pivotally mounted at 37 a brake-lever 38, which brake-lever is movably disposed in substantially the position shown in Fig. 1, lying behind and adjacent to the aforesaid belt-wheel 14. This lever is offset laterally, as indicated at 39, so that a surface 40 may be provided which may come into contact with the periphery of the belt-wheel, as will be readily understood, the parts at this point constituting a brake-shoe or its equivalent.

To the upper side of the aforesaid crossbar 31 there is attached a rigid arm 41, which is disposed in an inclined direction, as shown, so that its extremity 42 lies substantially above the extremity 43 of the aforesaid brake-lever 38, the said extremities 42 and 43 being connected by a cable, such as the chain 44. (Shown upon the drawings.) The arrangement of the parts is such that when the beam 30 occupies substantially the position in which it is shown in Fig. 1 the lever 38 will be maintained in an elevated position, so that the surface 40 is maintained out of contact with the periphery of the belt-wheel. When, however, the mechanism has moved so that the beam 30 occupies substantially the position 30ª in which it is indicated in the dotted outline, it permits the brake-lever 38 to descend, as will be readily understood, so that the surface 40 will rest upon the periphery of the wheel 14. In this manner at such times a braking force is impressed upon the mechanism, and it should be observed that the times at which this braking force will be applied are identical with the instants at which the return movement of the plunger begins, and it will be remembered that just at this time the elastic force of the hay is transmitting an impulsive force to the plunger. From this arrangement the application of the brake at this time operates to absorb the force being transmitted by the hay, so that the resultant effect upon the mechanism is substantially the same as if the hay had exerted no force upon it. In other words, the application of the brake just at the proper moment compensates for the elastic force of the hay and prevents an undesirable impulse being given to the mechanism, which impulse is especially undesirable where the mechanism is driven by means of a belt in a manner such as that illustrated, it being understood that a sudden force acting through a belt would have a tendency to break the belt or throw it off its pulleys, and even if this catastrophe did not occur the jerk given to the machinery would be transmitted to the horse-power which was driving the press and be felt by the horses while at work. This is also undesirable.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included with the scope of the following claims or of mechanical equivalents to the structures set forth.

Having described my invention, what I claim as new, and desire to secure by Letters Patent, is—

1. In a hay-press, in combination, a chamber in which the hay may be compressed, a plunger, a wheel, mechanism between said wheel and said plunger whereby said wheel rotates when said plunger reciprocates, a lever constituting a brake which may be applied to said wheel, a feed-arm, automatic means for actuating said feed-arm, and a connection between said feed-arm and said lever, whereby the application of said brake may be controlled.

2. In a hay-press, in combination, a compression-chamber, a plunger, means for advancing and returning said plunger within said chamber, a wheel adapted to rotate when said plunger moves, said chamber having a hopper adapted to receive hay, a feed-arm cooperating with said hopper, a brake normally impelled by gravity to rest against said wheel, and means connecting said brake with said feed-arm for controlling the same.

3. In a hay-press, in combination, a compression-chamber, a hopper adapted to receive hay, a feed-arm adapted to coöperate with said hopper, means for rocking said feed-arm upon a horizontal axis, a plunger, a wheel, means for reciprocating said plunger by driving said wheel, a brake impelled by gravity to toward said wheel, and a connection between said brake and said feed-arm.

In witness whereof I have hereunto set my hand in the presence of two witnesses.

NIL CAYOUETTE.

Witnesses:
PAUL ST. LAURENT,
JEAN BAPTISTE LANGLAIS.